Aug. 17, 1965

S. M. PATTILLO ETAL 3,200,570

MOISTURE CONTROL UNIT

Filed Aug. 9, 1962

INVENTORS
Sidney M. Pattillo
L. D. France

BY

ATTORNEY

Aug. 17, 1965    S. M. PATTILLO ETAL    3,200,570
MOISTURE CONTROL UNIT
Filed Aug. 9, 1962    2 Sheets-Sheet 2
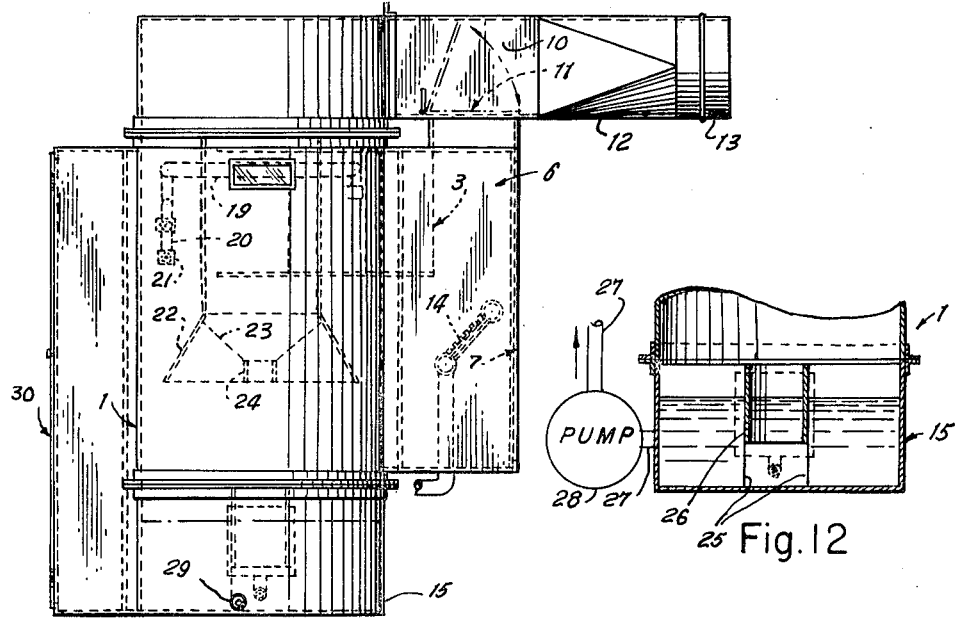
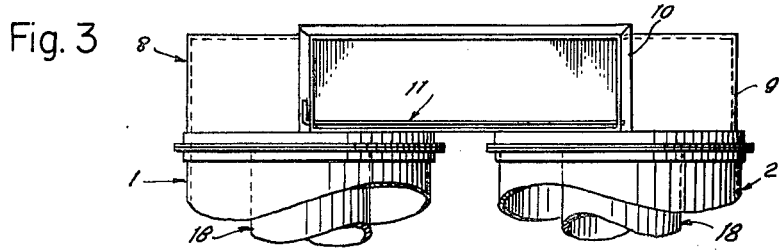
Fig. 3
Fig. 4
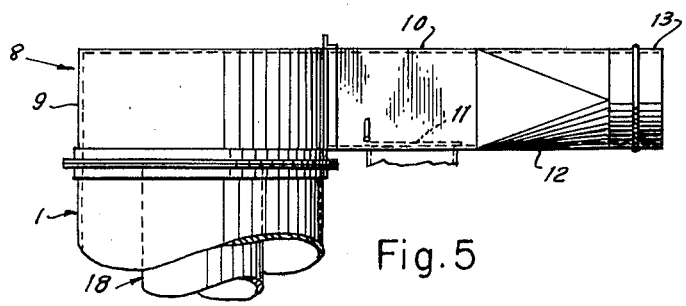
Fig. 5
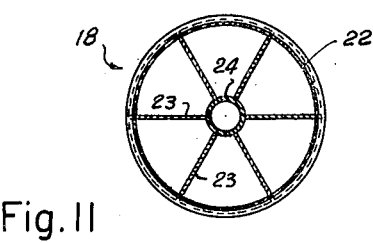
Fig. 11
INVENTORS
Sidney M. Pattillo
L. D. France
BY
ATTORNEY

United States Patent Office 3,200,570
Patented Aug. 17, 1965

3,200,570
MOISTURE CONTROL UNIT
Sidney M. Pattillo and L. D. France, Lubbock, Tex.; said Pattillo assignor, by mesne assignments, to L. D. France & Co., Inc., a corporation of Texas
Filed Aug. 9, 1962, Ser. No. 215,877
1 Claim. (Cl. 55—227)

This invention relates to a moisture control unit, and it concerns more particularly an apparatus for controlling the moisture content of a stream of air whereby the air may be either humidified or dehumidified as necessary to control the moisture content thereof.

The invention is applicable particularly to cotton gins, in which it is customary to control the moisture content of the cotton as it is being processed, to dry the cotton while at the same time retaining an optimum amount of moisture therein to improve its quality, by contacting the cotton at one or more stages of its processing with a stream of heated air, or air in admixture with combustion gases, the humidity of which is controlled by the addition of moisture thereto in inverse ratio to the moisture content of the cotton being processed. While the air may have a greater or lesser degree of humidity, it should not be damp. It is customary therefore to remove excess moisture from the air by various means, usually including an arrangement of baffles defining between them restricted passages thru which the air is passed while rapidly and repeatedly changing its direction of flow, upon adding moisture to the air to control its humidity.

The invention contemplates novel means for adding moisture as required to a stream of air while at the same time removing excess moisture therefrom.

An object of the invention is to provide apparatus for the purpose described having a relatively large capacity in proportion to the size of the equipment, and in which the apparatus is not likely to become clogged with foreign matter which may be entrained with the air and does not require frequent shut downs for cleaning, thus insuring substantially continuous operation and avoiding expensive delays and losses of operating time.

In apparatus heretofore employed for the purpose described it has been found that the restricted passages thru which the air is passed while rapidly and repeatedly changing its direction of flow, whereby excess moisture is removed therefrom, quickly become clogged with trash entrained with the air, whereby frequent shut downs are required for cleaning of the apparatus.

This invention contemplates first passing the air thru a screen characterized by its large surface area relative to the rate of flow of air thru the screen, and by its coarse mesh, to remove sticks, leaves, and comparatively large pieces of trash which may be associated with the air, in a preliminary step prior to adding moisture to the air as required and separating excess moisture therefrom, the size of the screen and its mesh being such that it does not tend to become clogged quickly and may be used for comparatively long periods of time without cleaning.

The invention further contemplates adding moisture to the air as required while at the same time removing excess moisture therefrom, along with any sand, lint, or other foreign matter which may have passed thru the screen, by the action of gravity and centrifugal force, employing principles which have heretofore been employed successfully in dust collecting systems, for example, whereby the need for frequent shut downs for cleaning is avoided.

The invention will be readily understood by referring to the following description and the accompanying drawing, in which:

FIG. 3 is a side elevational view;

FIGS. 4 and 5 are elevational views showing details of the discharge ducts leading to the fan whereby air is drawn thru the apparatus;

Figure 1:
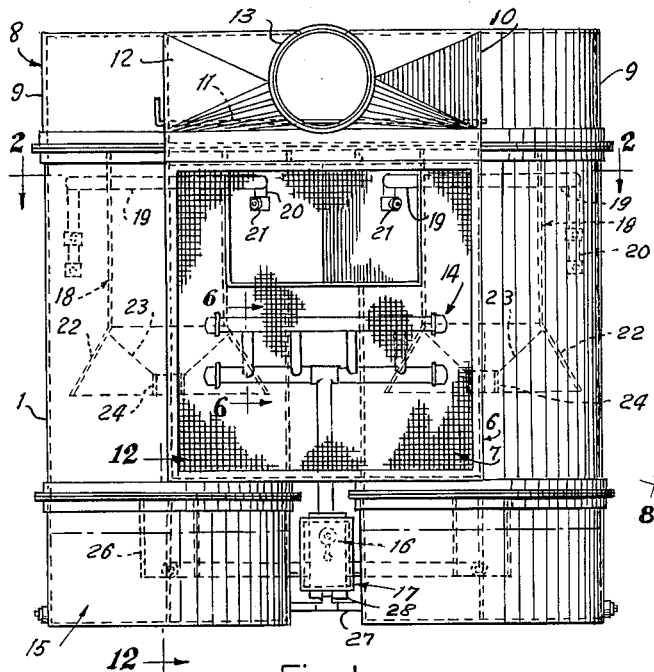
FIG. 1 is a front elevational view of a moisture control unit embodying the invention.
Figure 6:
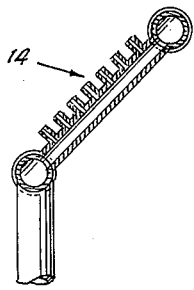
FIG. 6 is an elevational view taken on the line 6—6 of FIG. 1 showing the heater whereby the air is heated.
Figure 7:
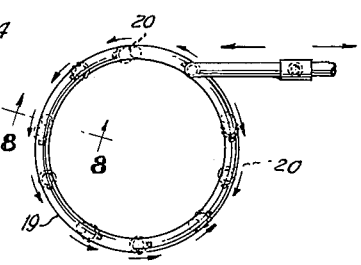
Figure 2:
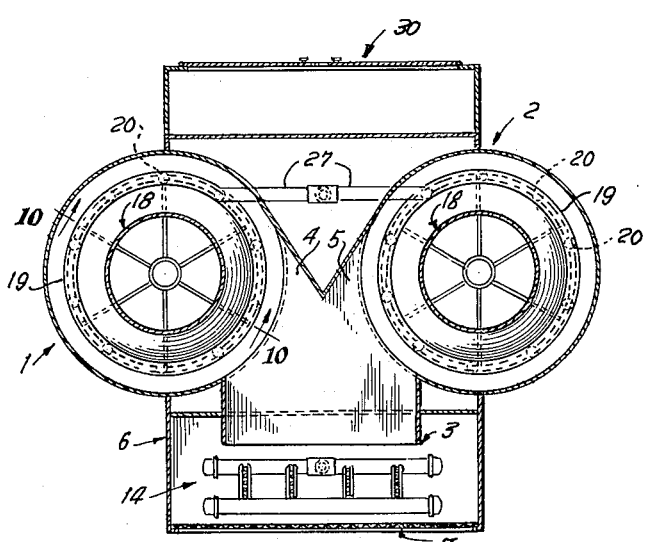
FIG. 2 is a sectional plan view taken on the line 2—2 of FIG. 1.
Figure 8:
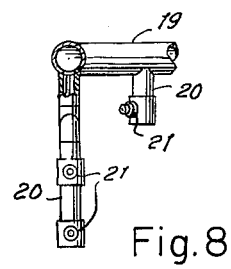
Figure 9:
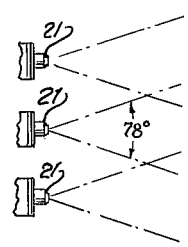
Figure 10:
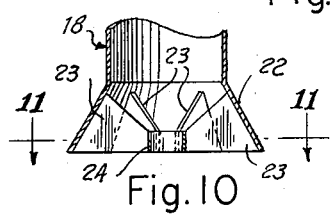

FIGS. 7, 8, and 9 show details of the water spray nozzles;

FIGS. 10 and 11 show details of a baffle arrangement adjacent the lower ends of the cylindrical internal partitions within the humidifying chambers; and FIG. 12 is a sectional elevational view taken on the line 12—12 of FIG. 1 showing details of a baffle arrangement in the circulating water supply tanks which comprise the lower portions of the humidifying chambers.

Referring to the drawing, the moisture control unit of the invention includes a pair of vertically disposed cylindrical humidifying chambers, designated generally by the numerals 1 and 2, which are arranged in closely spaced relation to each other and have a common intake duct 3 arranged between them and extending forwardly relative thereto.

The intake duct 3 is connected to the humidifying chambers 1, 2 by branch ducts 4, 5, respectively, which communicate with adjacent side portions of the humidifying chambers 1, 2 adjacent their upper ends and are arranged tangentially relative thereto.

The intake duct 3 extends thru the rear wall of a relatively larger, generally rectangular housing 6, which is positioned forwardly of the humidifying chambers 1, 2.

The front end of the housing 6, which is open and is relatively large as compared to the size of the intake duct 3, has a screen 7, coextensive therewith, characterized by its large size relative to the rate of flow of air thru it, and by its coarse mesh, extending across it.

A discharge duct, indicated generally by the numeral 8, has a generally rectangular portion 9 which communicates with upper portions of the humidifying chambers 1, 2, and has a forward extension 10 of reduced dimensions communicating with a valved bypass connection 11 whereby it is connected to the top of the housing 6, forwardly of the humidifying chambers 1, 2, whereby air entering the housing 6 may be bypassed around the humidifying chambers 1, 2. The forward extension 10 is connected by a shaped duct 12 to a round pipe 13 leading to a fan (not shown) whereby air is drawn thru the unit.

The housing 6 has a heater, indicated generally by the numeral 14, which as shown consists of an open flame flame burner or radiant heater arranged to burn gas or liquid fuel, and which may be of any suitable construction, disposed therein forwardly of the humidifying chambers 1, 2, and below the valved bypass connection 11, whereby air entering the housing 6 is heated, after first passing thru the screen 7, before it enters the huimidifying chambers 1, 2, or alternatively, is discharged thru the valved bypass connection 11.

In a modified form of the invention the air may be heated by means not shown before it enters the housing 6.

The bottom portions of the humidifying chambers 1, 2 comprise water supply tanks 15, in which a predetermined water level is maintained by means of a float valve 16 in a connecting water make up tank 17, which is common to the water supply tanks 15 and controls the supply of make up water thereto as necessary to compensate for water consumed. Water is circulated from the water supply tanks 15 to and from an arrangement of spray nozzles as hereinafter described.

The humidifying chambers 1, 2 have cylindrical internal partitions 18 of relatively smaller diameter arranged concentrically and coaxially relative thereto and extending downwardly from the tops thereof, above the water supply tanks 15, whereby air entering the humidifying chambers 1, 2 thru the intake duct 3 and the branch ducts 4, 5 is caused to flow circumferentially and downwardly therein, exteriorly of the internal partitions 18, and then upwardly thru the internal partitions 18.

The spray nozzle arrangement above referred to includes an annular manifold 19 arranged horizontally in the upper portion of each of the humidifying chambers 1, 2, in the annulus surrounding the internal partition 18. The annular manifold 19 has a series of depending downflow pipes 20 communicating therewith at circumferentially spaced intervals.

The downflow pipes 20 are staggered, and are arranged in groups in which adjacent downflow pipes 20 have one or more spray nozzles 21 attached thereto arranged to discharge at different elevations, the elevation of the spray nozzles 21 corresponding generally to that of the intake duct 3 and the branch ducts 4, 5.

The downflow pipes 20 of one group, which are aligned circumferentially wtih the branch ducts 4, 5, have their spray nozzles 21 arranged to discharge in a circumferential direction opposite the flow of air, in opposing relation to the air as it enters the humidifying chambers 1, 2, while the downflow pipes 20 of the remaining groups have their spray nozzles 21 arranged to discharge in a circumferential direction corresponding to the flow of air.

The lower end portions of the internal partitions 18 are flared downwardly and outwardly, as at 22, whereby they approach the diameter of the humidifying chambers 1, 2, so that the velocity of air moving downwardly in the humidifying chambers 1, 2, exteriorly of the internal partitions 18, is increased with a corresponding increase in the applied centrifugal force, to thereby separate entrained moisture as well as solids, immediately preceding reversal of its direction of flow.

The flared lower end portions 22 of the internal partitions 18 have a series of circumferentially spaced, radially inwardly extending baffles 23 which are connected at their inner ends to an annular baffle 24 whereby the swirling motion of the air is abruptly interrupted, to thereby induce gravity separation of entrained moisture as well as solids, immediately following reversal of its direction of flow.

The water supply tanks 15 have a series of circumferentially spaced, radially inwardly extending baffles 25 which are connected at their inner ends to an annular baffle 26 whereby the swirling motion of the water in the tanks in response to the downwardly spiraling flow of air thru the annulus surrounding the internal partitions 18 is arrested, simultaneously with reversal of the direction of flow of air whereby it is advanced upwardly thru the internal partitions 18, to thereby prevent water in the tanks 15 from being displaced from the tanks by centrifugal action and to permit a uniform water level to be maintained in the tanks.

The spray nozzles 21 are supplied with water from the water supply tanks 15 by fluid conduits 27 communicating with the annular manifolds 19 and having a pump 28 operatively connected therein.

The water supply tanks 15 have plugged openings 29 therein for use in cleaning the tanks.

The moisture control unit above described advantageously may be fully automatic, and the controls therefor may be enclosed in a cabinet 30 positioned rearwardly of the humidifying chambers 1, 2.

The invention may be modified in various ways without departing from the spirit and scope thereof.

We claim:

Apparatus for controlling the moisture content of a stream of air, whereby the air may be either humidified or dehumidified as necessary to control the moisture content thereof, comprising a housing having an air intake opening, open to the atmosphere, substantially coextensive with one side thereof, and having a screen stretched across said opening, a pair of vertically disposed cylindrical humidifying chambers each having an intake duct communicating with one side thereof adjacent its upper end and arranged tangentially relative thereto, said intake ducts merging adjacent one of their ends and communicating with the side of said housing opposite said air intake opening, said air intake opening being substantially larger than said air intake ducts, whereby said screen is characterized by its large size relative to the rate of flow of air thru it, and said screen being further characterized by its course mesh whereby it is adapted to removed sticks, leaves, and large pieces of trash from air entering the housing while permitting sand, lint, and other foreign matter of smaller particle size to pass thru it, a discharge duct communicating with the tops of said chambers, centrally thereof, and extending across the top of said housing, a water supply tank in the bottom of each of said chambers having float controlled means for maintaining a predetermined water level therein, a cylindrical internal partition of relatively smaller diameter than said chambers in each of said chambers arranged concentrically and coaxially relative thereto, surrounding an opening in the top of said chamber communicating wtih said discharge duct, and extending downwardly from the top thereof, above the water supply tank, whereby air entering said chambers, respectively, is caused to flow spirally downwardly thru an annulus surrounding the internal partition and then upwardly thru said partition, the cylindrical internal partitions each being flared downwardly and outwardly adjacent its lower end and having a series of circumferentially spaced baffles extending radially inwardly therefrom adjacent its lower end, and the water supply tank having a series of circumferentially spaced, radially extending baffles therein connected at their inner ends to an annular baffle spaced above the bottom of the tank, a series of water spray nozzles in each of said chambers, in the upper portion of the annulus surrounding the internal partition, having means for supplying water thereto from the water supply tank and arranged to discharge water in the path of air entering the chamber, the water spray nozzles being arranged in groups spaced circumferentially relative to each other, said groups each consisting of a plurality of spray nozzles positioned at different elevations each coinciding generally with the elevation of the air intake duct, the water spray nozzles of one group being positioned opposite the intake duct and being arranged to discharge water in a circumferential direction opposite the flow of air entering the chamber and the water spray nozzles of the remaining groups being arranged to discharge water in a circumferential direction corresponding to the flow of air, a valved bypass connection in the top of said housing communicating directly with said discharge duct independently of said chambers, and means in said housing for heating air entering said housing before it is discharged therefrom into said chambers, thru said intake ducts, or alternatively, directly into said discharge duct thru said valved bypass connection.

References Cited by the Examiner

UNITED STATES PATENTS

| | | |
|---|---|---|
| 853,517 | 5/07 | Osborne. |
| 1,543,942 | 6/25 | Mathesius _____ 55—94 X |
| 1,708,697 | 4/29 | Jensen _____ 55—413 XR |
| 1,758,983 | 5/30 | Seymour _____ 55—235 |
| 1,895,652 | 1/33 | Fisher. |
| 2,010,231 | 8/35 | Heist _____ 55—413 |
| 2,239,595 | 4/41 | Cummings _____ 261—141 XR |
| 2,575,359 | 11/51 | Ortgies _____ 55—246 X |
| 2,684,232 | 7/54 | Caldwell. |
| 2,792,905 | 5/57 | Forrest _____ 55—227 |
| 2,976,949 | 3/61 | Murphy et al. _____ 55—223 |

FOREIGN PATENTS

| | | |
|---|---|---|
| 1,067,328 | 1/54 | France. |

HARRY B. THORNTON, *Primary Examiner.*

ROBERT F. BURNETT, *Examiner.*